Patented Mar. 24, 1925.

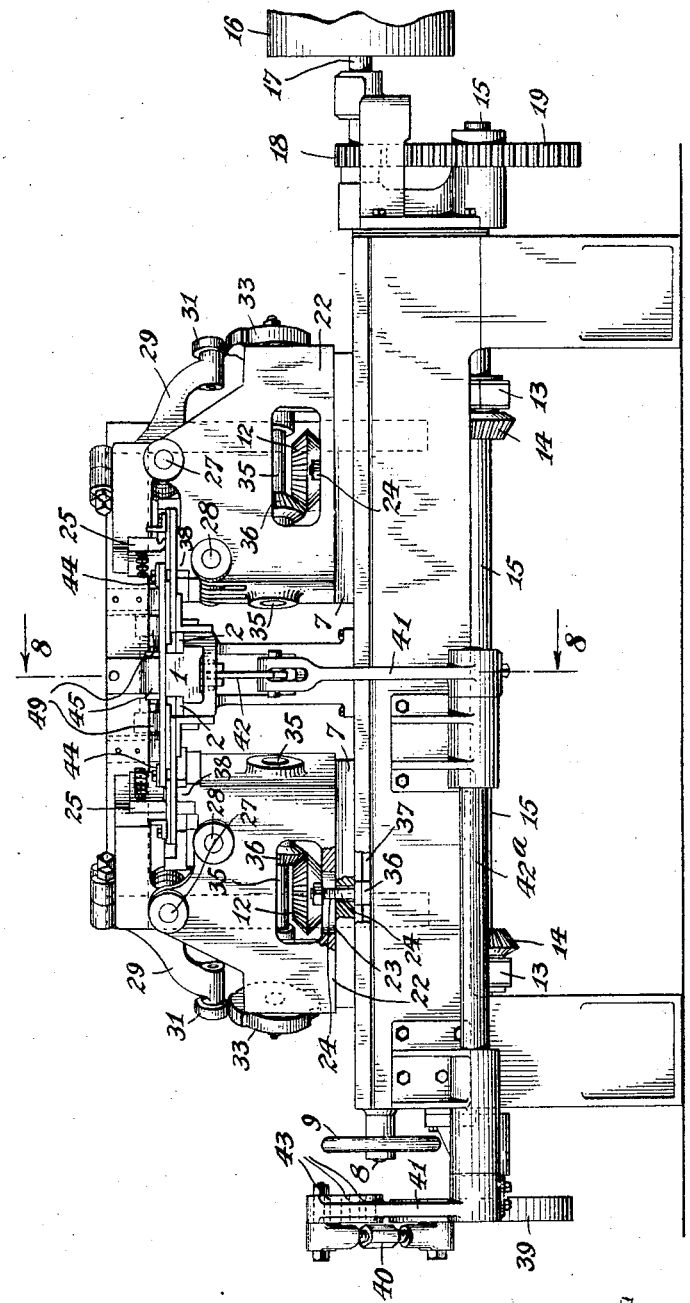

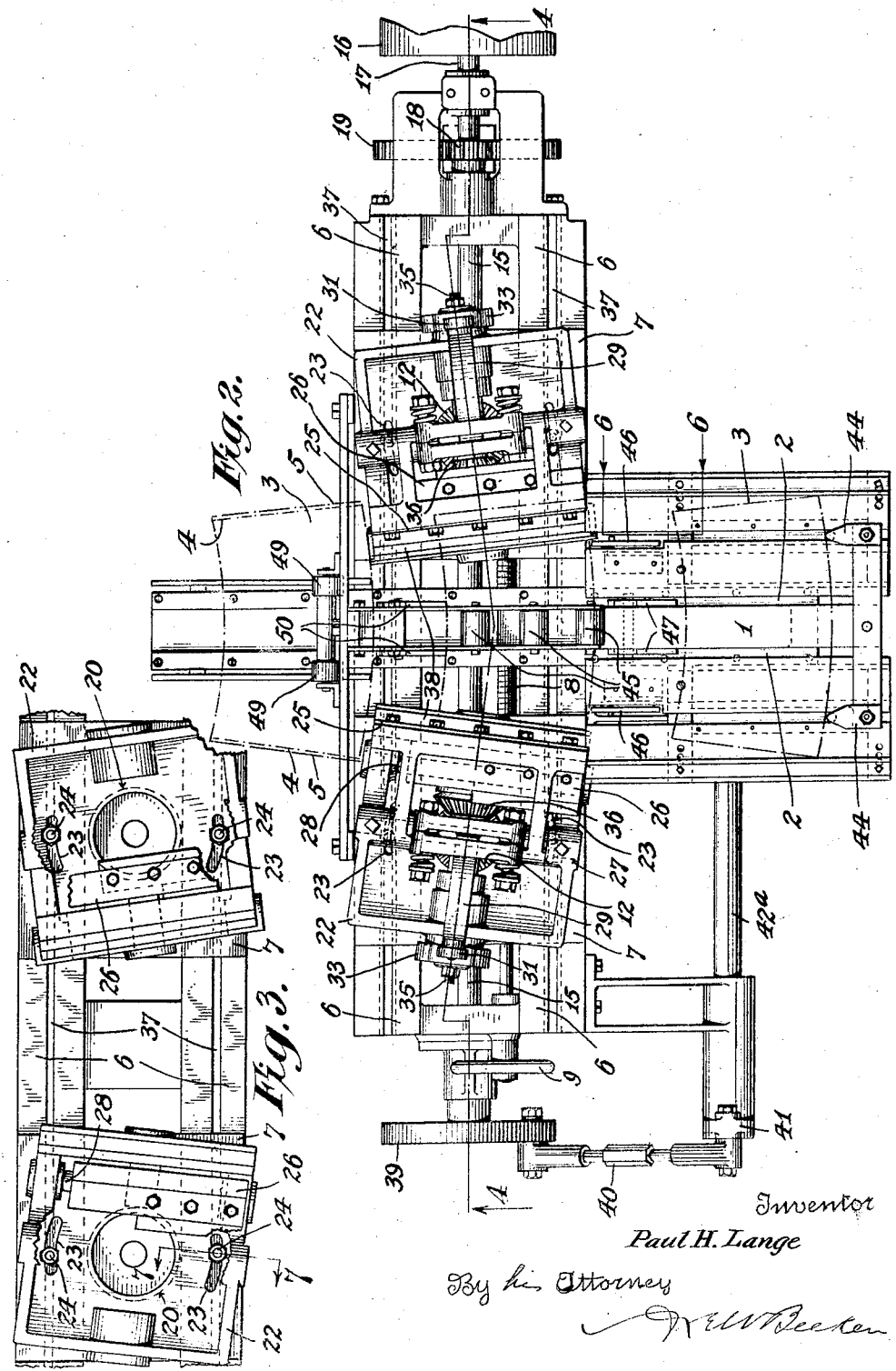

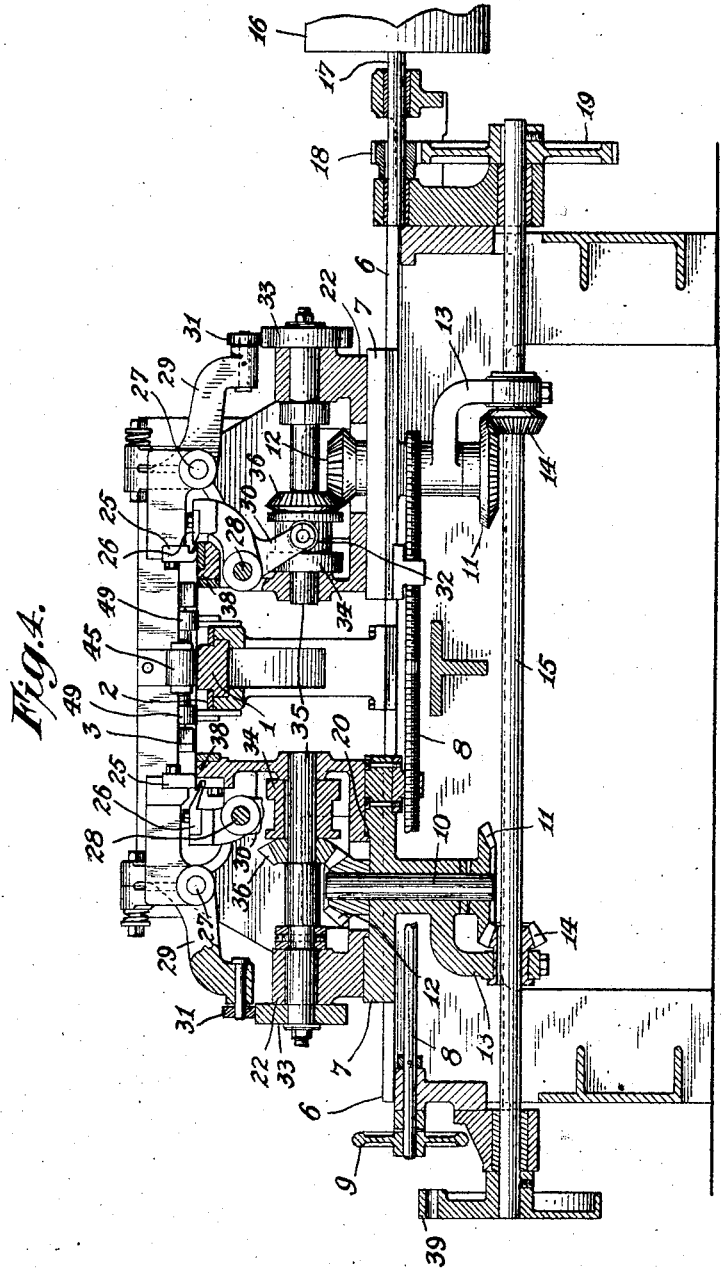

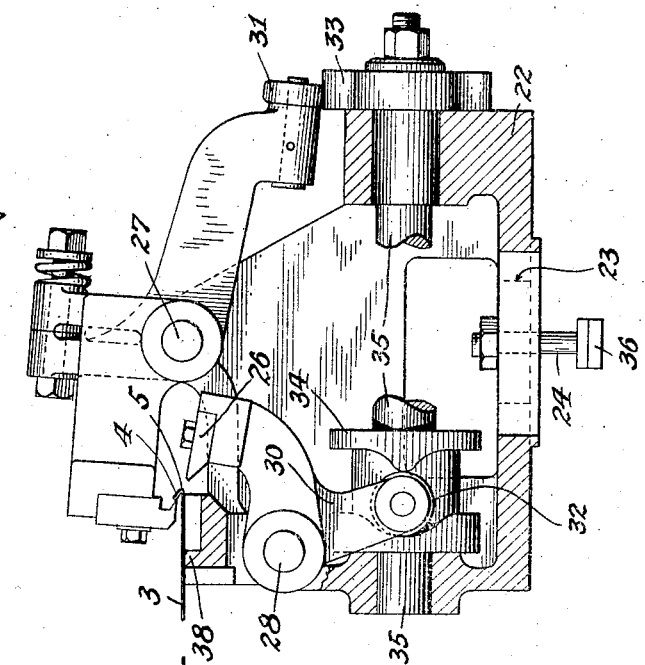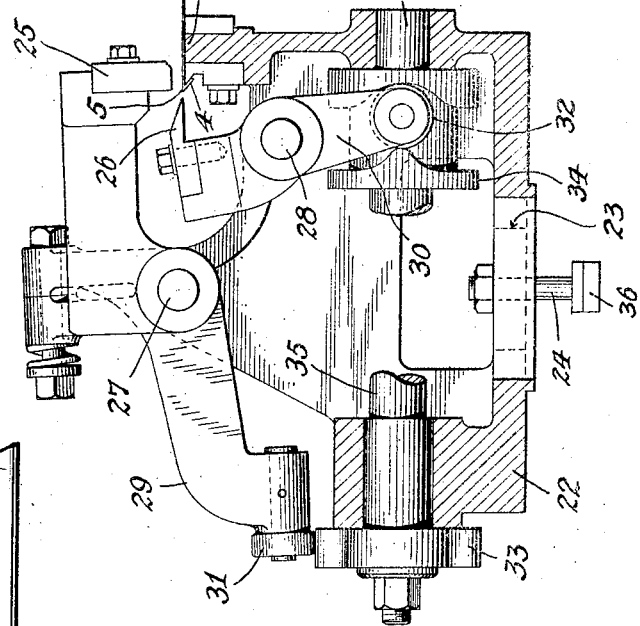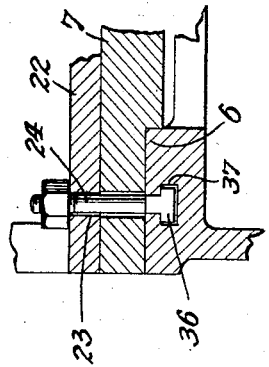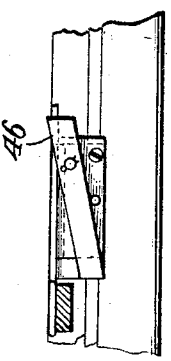

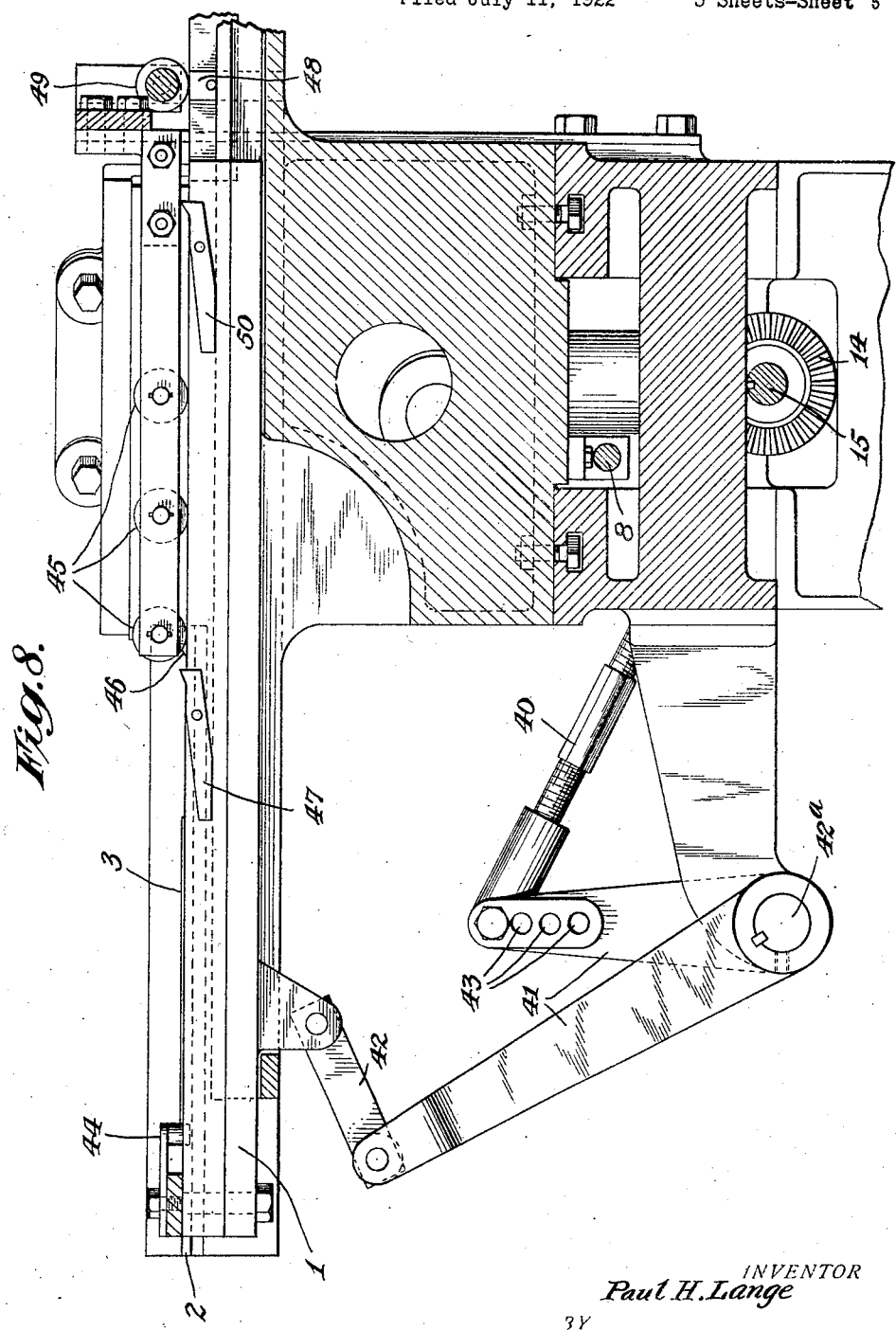

1,530,502

UNITED STATES PATENT OFFICE.

PAUL H. LANGE, OF BRIDGEPORT, CONNECTICUT, ASSIGNOR TO THE MAX AMS MACHINE COMPANY, OF BRIDGEPORT, CONNECTICUT, A CORPORATION OF NEW YORK.

EDGING MACHINE.

Application filed July 11, 1922. Serial No. 574,333.

*To all whom it may concern:*

Be it known that I, PAUL H. LANGE, a citizen of the United States, and a resident of Bridgeport, in the county of Fairfield and State of Connecticut, have invented certain new and useful Improvements in Edging Machines, of which the following is a specification.

This invention relates generally to edging machines and has for its main object and feature a machine for edging segmental shaped blanks of varying sizes and different degrees of angularity of sides so arranged that the machine may be adjusted to act on different segmental shaped blanks passing through the machine in a given path.

In the accompanying drawings the invention is disclosed in a concrete and preferred form in which Figure 1 is a front elevation of a machine embodying the invention:

Fig. 2 is a plan view thereof:

Fig. 3 is a fragmentary plan view of the tool heads and adjacent elements with parts broken away and in section:

Fig. 4 is a vertical longitudinal section on the plane of line 4—4 of Fig. 2:

Fig. 5 is a view, similar to Fig. 4, of the two tool heads showing the jaws in their retracted position:

Fig. 6 is a detail sectional view on the plane of line 6—6 of Fig. 2 showing one of the holding pawls of the feed mechanism:

Fig. 7 is a detail sectional view on the line 7—7 of Fig. 3:

Fig. 8 is a longitudinal vertical sectional view through the feeding mechanism on the plane of line 8—8 of Fig. 1.

1 is a suitable blank feeding mechanism here shown as a reciprocating carriage sliding in suitable ways 2 for feeding a blank intermittently through the machine: The particular blank here in question is indicated in dotted lines 3 of Fig. 2 and is, in the present instance, a segmental shaped section of a tub, a number, greater than two, of which are united to form the tub. In order to properly unite them, it is desirable to provide the side edges of the blanks with hooks, as 4 (Fig. 5), to form a lock seam. It will be understood that, depending upon the size of the tub to be made, the size, the shape of the blank and the degree of angularity of the side edges 5 thereof will vary and therefore it is an object of this invention to make the machine adjustable so that blanks of different size and shape can be properly edged.

Arranged on either side of the reciprocating carriage 1, which feeds the blank in a given path through the machine, is a guide 6 on which is a slide 7. The two slides 7 are arranged to be moved toward and away from each other by any suitable means, here taking the form of a rotatable rod 8 actuated by a handle 9 and devoid of lengthwise movement. This rod is provided with right and left hand threads, as shown, so that rotation of the rod will move the slides toward and away from each other. Mounted upon each of said slides is a vertically extending shaft 10 having lower and upper bevel gears 11 and 12; and extending from said slides are two brackets 13 that carry bevel gears 14 slidably mounted on what may be called a main shaft 15. It will therefore be understood that, whatever the adjusted position of the slides, power will be transmitted to the upright shafts. Power may, of course, be transmitted to the main shaft in any suitable way, as by means of pulley 16, on power shaft 17, pinion 18 and spur gear 19.

Each of the slides 7 is provided with a circular way 20, concentric with the axis of rotation of vertical shafts 10, and mounted on each of said slides is a head 22 circumferentially adjustable on circular ways 20 and provided with arcuate slots 23 and bolts 24 whereby the heads may be secured in any position to which they have been adjusted. Each of the heads also carries an edging tool here shown as being composed of two jaws 25 and 26 which coact to form a hook on each side edge of the blank. It will be observed that by these means the jaws aforesaid may be made parallel to the side edge of the blank notwithstanding that said side edge is not parallel to the given path of the blank through the machine. Jaws 25 and 26 are pivotally supported at 27 and 28 and are actuated by means of levers 29 and 30, rollers 31 and 32 and cams 33 and 34 mounted on cam shaft 35. Shaft 35 receives motion from the upright shaft by means of bevel gear 36. From the foregoing, it will be understood that power will be transmitted to the cam shaft, and therefore to the jaws, regardless of the position circumferentially occupied by the head. It will also be clear that the jaws are so arranged (Fig. 5) that the large rear end of the blank will not interfere with the jaws when the latter are in their retracted position and said blank is passing through the machine. Bolts 24 are of noteworthy construction. As shown in Fig. 7, each bolt 24 carries, at its lower end, a head 36 which is seated in a straight slot 37 of the guide.

The means for feeding the sheets through the machine may take many forms. As shown, the sheet is placed upon the reciprocating carriage 1 and upon ledges 38. Reciprocating carriage 1 is given an intermittent movement by means of crank 39, on the main shaft, connection 40, bell crank 41 and link 42. Bell crank 41 is mounted on rock shaft 42ª and one of the arms of the bell crank is provided with a series of bolt holes 43 so that the amount of feeding movement may be regulated. Mounted on the reciprocating carriage are pusher fingers 44 that carry the sheet to a position beneath rollers 45, which are rotatable in either direction, (Fig. 8) and, to a point beyond stop pawls 46, pivotally mounted in the stationary framework. Upon the return stroke of the reciprocating carriage, the friction, caused by interposition of the tin sheet, between the carriage and the rollers moves the sheet rearwardly to a slight extent against the stop pawls that act as gages to position the sheet with respect to the edging device. While in this position the edging operation takes place. Upon the next forward stroke of the reciprocating carriage, pawls 47 engage the rear end of the blank and feed it forward between stationary guide 48 and friction roller 49 where the sheet remains during the return stroke of the carriage. Upon the next reciprocation of the carriage, pawls 50 push the sheet out of the machine. Pawls 47 and 50 are of a type well known in this art, viz: they are biased, by springs or gravity or both, to normally project above the plane of the blank and are depressed on the return stroke of the carriage. Pawls 46 are depressed on the forward stroke of the carriage.

I claim:

1. An edging machine comprising: means for feeding a blank through the machine in a given path, an edging tool, means for adjusting said edging tool to lie parallel longitudinally to the side edge of the blank notwithstanding that said side edge may be at an angle longitudinally to the given path, and means for actuating the edging tool in any of its adjusted positions.

2. An edging machine comprising: means for feeding a blank through the machine in a given path, an edging tool including two jaws, means for adjusting said edging tool to make the jaws lie parallel longitudinally to the side edge of the blank notwithstanding that said side edge may be at an angle longitudinally to the given path, and means for actuating the jaws in any of the adjusted positions of the tool.

3. An edging machine comprising: means for feeding a blank through the machine in a given path, a tool head, a cam shaft carried by said head, a vertically extending shaft for driving said cam shaft, the tool head adjustable circumferentially on an axis substantially coincident with that of the vertically extending shaft, an edging tool including two jaws to act on the blank, and means for actuating the jaws from the cam shaft.

4. An edging machine comprising: means for feeding a blank through the machine in a given path, a slide movable transversely with respect to said path, a main shaft, a vertically extending shaft carried by the slide, sliding driving connections between the main and vertically extending shafts, a tool head circumferentially adjustable on the slide on an axis substantially coincident with that of the vertically extending shaft, an edging tool including two jaws on the tool carrier, a cam shaft on the tool carrier driven from the vertically extending shaft, and means for actuating the jaws from the cam shaft.

5. An edging machine comprising: means for feeding a blank through the machine in a given path, an edging tool, means for adjusting said edging tool to lie parallel longitudinally to the side edge of the blank notwithstanding that said side edge may be at an angle longitudinally to the given path, means for actuating the edging tool in any of its adjusted positions, and means for adjusting the edging tool toward and away from the path aforesaid.

6. An edging machine comprising: means for feeding a blank through the machine in a given path, two edging tools, one on each side of said path, means for adjusting each edging tool to lie parallel longitudinally to the adjacent side edges of the blank notwithstanding that said side edges may be at different angles longitudinally to the given path, and means for actuating the edging tools in any of their adjusted positions.

7. An edging machine comprising: means for feeding a blank through the machine in a given path, two edging tools, one on each side of said path, means for adjusting each edging tool to lie parallel longitudinally to the adjacent side edges of the blank notwithstanding that said side edges may be at different angles longitudinally to the given path, means for actuating the edging tools in any of their adjusted positions and means for moving said edging tools toward and away from each other.

8. An edging machine comprising: means for feeding a blank through the machine in a given path, two slides, one on each side of said path and transversely movable with respect thereto, a main shaft, a vertically extending shaft carried by each slide, sliding driving connections between the main and vertically extending shafts, a tool head carried by each slide and circumferentially adjustable thereon on an axis substantially coincident with that of the vertically extending shaft, an edging tool on each tool carrier, a cam shaft on each tool carrier driven from the vertically extending shaft, and means for actuating the tool from the cam shaft.

9. An edging machine comprising: means for feeding a blank through the machine in a given path, an edging tool, means for adjusting said edging tool toward and away from said path, means for angularly adjusting said edging tool so that it will lie parallel longitudinally to the side edge of the blank notwithstanding that said side edge may be at an engle longitudinally to the given path, and means for actuating the edging tool in any of its adjusted positions.

10. An edging machine comprising: means for feeding a blank through the machine in a given path, an edging tool on each side of said path, means for adjusting said edging tools toward and away from each other, means for angularly adjusting said edging tools so that they will lie parallel longitudinally to the side edges of the blank notwithstanding that said side edges may be at an angle longitudinally to the given path, and means for actuating the edging tools in any of its adjusted positions.

11. In a machine of the character set forth, a guide, having slideways and straight slots, a slide movable in said slideways, a head circumferentially adjustable on said slide, and having arcuate slots, and bolts, extending through said arcuate slots, through the slide and into the straight slots of the guide, said bolts having heads located in said straight slots.

12. Sheet feeding mechanism comprising: a series of rollers rotatable in either direction, stop pawls on a stationary part of the machine, and a reciprocating carriage for feeding, upon the stroke in one direction, a sheet forwardly over said pawls and under said rollers, and rearwardly, upon the stroke in the other direction, by friction between the carriage and rollers against said stop pawls.

13. Sheet feeding mechanism comprising: a series of rollers rotatable in either direction, stop pawls on a stationary part of the machine, and a reciprocating carriage for feeding, upon the stroke in one direction, a sheet forwardly over said pawls and under said rollers, and rearwardly, upon the stroke in the other direction, by friction between the carriage and rollers against said stop pawls, a stationary guide and a friction roller, means on the reciprocating carriage which, upon the succeeding stroke thereof, moves the sheet from its position beneath the series of rollers to a position between the stationary guide and friction roller.

14. Sheet feeding mechanism comprising: a series of rollers rotatable in either direction, stop pawls on a stationary part of the machine, and a reciprocating carriage for feeding, upon the stroke in one direction, a sheet forwardly over said pawls and under said rollers, and rearwardly, upon the stroke in the other direction, by friction between the carriage and rollers against said stop pawls, a stationary guide and a friction roller, means on the reciprocating carriage which, upon the succeeding stroke thereof, moves the sheet from its position beneath the series of rollers to a position between the stationary guide and friction roller and means in the reciprocating carriage which, upon the second succeeding stroke thereof, moves the sheet out of the machine.

Signed at Bridgeport, in the county of Fairfield and State of Connecticut, this 26th day of June, 1922.

PAUL H. LANGE.